(12) United States Patent
Bomal et al.

(10) Patent No.: US 6,265,069 B1
(45) Date of Patent: Jul. 24, 2001

(54) PARTICLES TREATED WITH A FUNCTIONALIZED POLYORGANOSILOXANE

(75) Inventors: Yves Bomal; Anny Guez; Gérard Velleret, all of Paris (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/142,640

(22) PCT Filed: Dec. 2, 1996

(86) PCT No.: PCT/FR96/01909

§ 371 Date: Jan. 4, 1999

§ 102(e) Date: Jan. 4, 1999

(87) PCT Pub. No.: WO97/21774

PCT Pub. Date: Jun. 19, 1997

(30) Foreign Application Priority Data

Dec. 8, 1995 (FR) .................................. 95 14537

(51) Int. Cl.⁷ ....................................... B32B 5/16
(52) U.S. Cl. ................. 428/405; 524/497; 524/586; 524/584; 524/579; 523/203; 523/209; 523/212; 523/213
(58) Field of Search ............ 428/405; 523/203, 523/209, 212, 213; 524/497, 586, 584, 579; 427/387

(56) References Cited

U.S. PATENT DOCUMENTS

| | | | |
|---|---|---|---|
| 3,849,152 | 11/1974 | Mimeault | 106/308 Q |
| 3,948,676 | 4/1976 | Laufer | 106/309 |
| 4,022,152 | * 5/1977 | Laufer et al. | 118/49.5 |
| 4,394,469 | 7/1983 | Stratta et al. | 523/212 |
| 4,454,288 | * 6/1984 | Lee et al. | 524/588 |

FOREIGN PATENT DOCUMENTS

| | | |
|---|---|---|
| 0 029 137 | 5/1981 | (EP) . |
| 0 141 174 | 9/1984 | (EP) . |
| 0 506 290 | 9/1992 | (EP) . |
| 0 522 916 | 1/1993 | (EP) . |
| 0 684 291 | 11/1995 | (EP) . |
| 96 16125 | 5/1996 | (WO) . |
| 96/16125 | * 5/1996 | (WO) . |

OTHER PUBLICATIONS

Database WPI, Week 8334, Derwent Publications Ltd., London, GB; AN83–744505 XP002012790 & JP 58 120 519 A (Hamada) Jul. 18, 1983.

Database WPI, Week 8935, Derwent Publications Ltd., London, GB; AN 89–251891 XP002012791 & JP 01 182 368 (Shiseido), Jul. 20, 1989.

Database WPI, Week 9428, Derwent Publications Ltd., London, GB; AN 94–230757 XP002012792 & JP 06 166 829 (Kogyo), Jun. 14, 1994.

Database WPI, Week 8833, Derwent Publications Ltd., London, GB; AN 88–231710 XP002012793 & JP 63 165 461 (Shiseido), Jul. 8, 1988.

* cited by examiner

Primary Examiner—Margaret G. Moore
(74) Attorney, Agent, or Firm—Burns, Doane, Swecker & Mathis, L.L.P.

(57) ABSTRACT

The present invention relates to inorganic particles, with the exception of silica, comprising at least one functionalized polyorganosiloxane grafted over all or part of their surface, the said polyorganosiloxane being functionalized by:
- at least one alkoxy group,
- and at least one organic group chosen from alkyls, alkenyls, mercaptoalkyls, sulphoxides, epoxys, (meth) acryloyloxy groups, amino groups, hydroxyl groups, siloxy groups, ethers, ketones, esters, phosphorus-containing groups or polymer portions comprising vinylaromatic, ether, amide or sulphur repeat units. The invention also relates to the process for the preparation of these particles. It also relates to compositions comprising the said particles and at least one thermoplastic polymer, particularly polyolefins.

26 Claims, No Drawings

PARTICLES TREATED WITH A FUNCTIONALIZED POLYORGANOSILOXANE

The present invention relates to new treated particles which can in particular be used in thermoplastics.

Inorganic particles used as pigments in plastics are generally introduced in pulverulent form into polymer mixtures for plastics. However, this introduction in pulverulent form requires specific equipment, with which plastic manufacturers are not always equipped.

To overcome this disadvantage, it is possible to use particles in the form of masterbatches, which are mixtures of thermoplastic polymer(s) and of a high proportion of particles. It suffices for the plastics manufacturer, to whom the masterbatch is sold, to dilute the said masterbatch in a larger amount of polymer(s) in order to obtain the desired content of particles and to prepare plastics.

The advantage of these masterbatches is that they are easier to handle than particles in pulverulent form.

However, the very manufacture of these masterbatches requires very powerful stirring devices, which consume a large amount of energy, in order to be able to incorporate the particles in the polymers. In order to improve the wetting of the particles by the polymers, provision has been made for treating the particles, for example with silicones of polydimethylsiloxane (PDMS) type.

Masterbatches of particles treated with such products which are currently marketed exhibit a particle concentration not exceeding 70% by weight. Higher particle concentrations can only be obtained, with the particles of the prior art, by using additives (polyethylene, carboxylates, and the like) which make it possible to improve the introduction of the fillers into the polymer mixture and with the aid of stirring devices which require the use of a large amount of energy, resulting in a preparation process which is not very profitable on an industrial scale.

One aim of the present invention is to provide new particles for the preparation of masterbatches which exhibit a higher particle concentration than the masterbatches of the prior art.

Another aim is to provide new particles which make possible the preparation of masterbatches using a small amount of energy.

For this purpose, the invention relates first of all to inorganic particles, with the exception of silica, comprising at least one functionalized polyorganosiloxane grafted over all or part of their surface, the said polyorganosiloxane being functionalized by:
- at least one alkoxy group,
- and at least one organic group W chosen from alkyls, alkenyls, mercaptoalkyls, sulphoxides, epoxys, (meth)acryloyloxy groups, amino groups, hydroxyl groups, siloxy groups, ethers, ketones, esters, phosphorus-containing groups or polymer portions comprising vinylaromatic, ether, amide or sulphur repeat units.

The invention also relates to processes for the preparation of these particles.

The invention also relates to a composition comprising particles according to the invention and at least one thermoplastic polymer.

The invention relates in addition to the use of the particles according to the invention in thermoplastic polymers.

Finally, the invention relates to the items obtained from thermoplastic polymers and comprising particles according to the invention.

The invention relates first of all to inorganic particles, with the exception of silica, comprising at least one polyorganosiloxane grafted over all or part of their surface, the said polyorganosiloxane being functionalized by:
- at least one alkoxy group,
- and at least one organic group chosen from alkyls, alkenyls, mercaptoalkyls, sulphoxides, epoxys, (meth)acryloyloxy groups, amino groups, hydroxyl groups, siloxy groups, ethers, ketones, esters, phosphorus-containing groups or polymer portions comprising vinylaromatic, ether, amide or sulphur repeat units.

The invention thus relates to particles treated at the surface with a polyorganosiloxane which must have at least two functionalities. The first is an alkoxy functional group and the second can be of fairly varied nature. The grafted polyorganosiloxane can have one or a number of functional groups of the second type.

According to the invention, the functionalized polyorganosiloxane which can be grafted to the surface of the particles comprises, per molecule:

α—on the one hand, at least one functional siloxy unit of formula (I):

$$R_a Y Si(O)_{(3-a)/2} \quad (I)$$

in which:
- a=0 or 1, and preferably 1,
- R is a monovalent hydrocarbon radical chosen from linear or branched alkyls having from 1 to 6 atoms, in particular methyl, ethyl, propyl or butyl, and/or from aryls, and in particular phenyl, methyl being more particularly preferred, the R radicals being identical or different when a=2,
- Y is a linear or branched alkoxy radical preferably chosen from $C_1$–$C_4$ alkoxys, in particular methoxy, ethoxy and (iso)propoxy being more particularly used, β—and, on the other hand, at least one functional siloxy unit of formula (II):

$$R_b W Si(O)_{3-b/2} \quad (II)$$

in which:
- b=0, 1 or 2,
- R corresponds to the same definition as that given above for the R substituent of the unit (I) and can be identical to or different from the latter,
- W is a monovalent hydrocarbon radical saving from 2 to 30 carbon atoms and optionally S and/or O atoms and constituting a functional residue connected to the silicon via an Si—C bond, this residue being chosen from the following groups:
  - (i) a linear or branched alkyl group comprising at least 7 carbon atoms,
  - (2i) a linear or branched $C_2$–$C_{20}$ alkenyl group containing one or a number of double bonds in the chain(s) and/or at the chain end(s), the said double bonds preferably being conjugated and/or combined with at least one activating group situated in the α-position and advantageously consisting of an ether or a thioether,
  - (3i) an unsaturated mono- or bicyclic aliphatic group containing 5 to 20 cyclic carbon atoms and one or two ethylenic double bond(s) in the ring, which double bond(s) is/are optionally substituted by one or two linear or branched $C_1$–$C_3$ alkyl group(s), the said cyclic group optionally being connected to the silicon via a linear or branched $C_2$–$C_{10}$ alkylene radical,
  - (4i) a mercaptoalkyl group of formula:

$$—R^1—S—A \quad (4i)$$

in which:
R$^1$ represents a linear or branched C$_2$–C$_{10}$ alkylene radical optionally comprising at least one oxygen heteroatom or one alkylene-cycloalkylene radical, the alkylene part of which has the same definition as that given immediately above and the cyclic part of which contains 5 to 10 carbon atoms and is optionally substituted by one or two linear or branched C$_1$–C$_3$ alkyl group(s), A corresponds:
either to hydrogen,
or to a masking group M connected to S by a bond which is labile under given conditions and which makes possible the replacement of M by H or the creation of an active species —R$^1$—S.;
(5i) a group comprising a polysulphide entity and corresponding to the following formula:

$$—R^2—(S)_x—R^3 \quad (5i)$$

with:
x=1 to 6,
R$^2$ having the definition as R above,
R$^3$ is a linear or branched C$_1$–C$_{10}$ alkyl,
(6i) a group containing at least one ring, at least one of the elements of which is a sulphur atom, and corresponding to the formulae below:

[chemical structures showing rings with sulphur]

in which
i=0, 1 or 2 and j=1 to 6
the R$^4$ and R$^5$ substituents are divalent radicals as defined above for R,
(7i) a sulphoxide group of formula:

$$—R^1—\underset{\underset{O}{\|}}{S}—M \quad (7i)$$

in which the R$^1$ and M symbols have the definitions given above for the formula (4i);
γ—and, optionally, at least one residual siloxy unit of formula (III):

$$R_cH_dSi(O)_{4-(c+d)/2} \quad (III)$$

in which:
c=0, 1, 2 or 3, d=0 or 1 and c+d ≤3
the R substituents being as defined above in the units (I) and (II).

In this type of polyorganosiloxane, the first alkoxy functionality Y is carried by the units of formula (I), whereas the second hydrocarbon functionality W appears in the units of formula (II) defined above.

The first type of functionalized polyorganosiloxane can contain, in addition to the units (I) and (II), at least one residual unit (III).

According to a terminology usual in silicones, these units (I) and (II) can be D units but also T units. In the case where T units are present, the polyorganosiloxanes exist in the form of linear chains crosslinked to one another.

It should be emphasized that, whenever more than one example of a unit of a given type (I, II or III, e.g.) is present in the functionalized polyorganosiloxane, the different examples can be identical to or different from one another.

It should be understood, taking into account the values which the indices a to d attributed to the substituents in the units (I), (II) and (III) can take, that the functionalized polyorganosiloxanes according to the first type can exhibit a linear and/or branched and/or cyclic structure.

The preferred R radicals are: methyl, ethyl, n-propyl, isopropyl or n-butyl, preferably methyl. More preferentially still, at least 80% by number of the R radicals are methyls.

The preferred Y alkoxy radicals are ethoxys.

The W substituent of the unit (II) of the first polyorganosiloxane type can in particular be chosen from the following radicals:
an alkyl radical (i) comprising from 8 to 30 carbon atoms and preferably chosen from the following alkyl radicals: octyl, dodecyl, undecyl or tridecyl;
a C$_6$–C$_{10}$ radical (2i) containing a double bond and optionally another conjugated to the first, the said radical advantageously being hexenyl or dodecenyl;
a monocyclic C$_5$–C$_6$ radical (3i), preferably cyclohexenyl or 1-methylcyclohex-1-enyl, optionally connected to the silicon via a linear or branched C$_2$–C$_6$ alkylene radical, preferably —CH$_2$—CH$_2$—, —CH$_2$—CH(CH$_3$)— or —(CH$_2$)$_3$—.

To be even more specific with respect to the first type of functionalized polyorganosiloxanes concerned, mention is first of all made of those formed by statistical, sequential or block linear copolymers of following average formula (IV):

$$Z—\underset{\underset{R}{|}}{\overset{\overset{R}{|}}{Si}}—O—\left[\underset{\underset{Y}{|}}{\overset{\overset{R}{|}}{Si}}—O\right]_m\left[\underset{\underset{W}{|}}{\overset{\overset{R}{|}}{Si}}—O\right]_n\left[\underset{\underset{R}{|}}{\overset{\overset{R}{|}}{Si}}—O\right]_p\left[\underset{\underset{H}{|}}{\overset{\overset{R}{|}}{Si}}—O\right]_q\underset{\underset{R}{|}}{\overset{\overset{R}{|}}{Si}}—Z \quad (IV)$$

in which:
the Y, W and R symbols are as defined above,
the Z symbol is a monovalent radical chosen from the radicals formed by hydrogen and from those corresponding to the definitions R, Y and W,
the sum m+n+p+q≧3, preferably of between 3 and 100; the case in which p=q=0, m≧1 and n≦50 being more particularly preferred,
0<m≦100, preferably 1≦m≦50
0<n≦100, preferably 1≦n≦50
0≦p≦20, preferably 0≦p≦10
0≦q≦40, preferably 0≦q≦20.

Mention may be made, among the more particularly preferred functionalized polyorganosiloxanes of formula (IV), of those for which p=q=0 and 0.1≦m/n ≦5, preferably 1≦m/n≦5 and more preferentially 1.5≦m/n ≦3.

An alternative to the linear structure of the polymers of formula (IV) defined above relates to the functionalized polyorganosiloxanes composed of cyclic copolymers of following average formula (V):

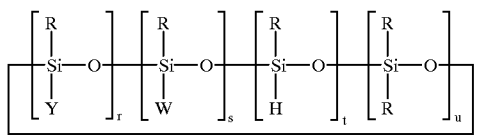
(V)

in which Y, W and R are as defined above and with r, s, t and u representing integers or positive decimals:

the sum $r+s+t+u \geq 3$, preferably of between 3 and 8, the case in which $t=u=0$ being more particularly preferred, $1 \leq r \leq 8$, preferably $1 \leq r \leq 4$ $1 \leq s \leq 8$, preferably $1 \leq s \leq 4$ $0 \leq t \leq 8$, preferably $0 \leq t \leq 4$ $0 \leq u \leq 8$, preferably $0 \leq y \leq 4$.

The polyorganosiloxanes are preferably composed of products corresponding to those for which $R=CH_3$ and $p=u=0$ in the formulae (IV) and (V) defined above.

It is obvious that, in these formulae (IV) and (V), as already mentioned above, the W radicals can be identical or different in nature when n>1 and s>1.

The mixtures of functionalized polyorganosiloxanes of the type of those defined above come within the scope of the present invention.

The functionalized polyorganosiloxanes of the first type as described above can be obtained by the process which comprises:

on the one hand, reacting a starting polyorganosiloxane comprising units of formula (II) as defined above, in which W represents hydrogen, with at least one alcohol from which the Y functionality of the unit (I) derives and which is useful both as reactant and as reaction solvent, in the presence of a catalyst, at least one of the active elements of which is chosen from transition metals, according to a dehydrocondensation mechanism (1st phase), and, on the other hand, making use of the addition of the polyorganosiloxane converted by dehydrocondensation to at least one olefin compound from which the W functionality of the unit (II) derives, according to a hydrosilylation mechanism (2nd phase), in the presence of a catalyst and preferably at a temperature of between 5 and 100° C. and more preferentially still between 20 and 90° C.

One of the novel features of this process lies in the use of the alcohol corresponding to the Y group both as reactant and as reaction solvent in the dehydrocondensation stage. According to this process, whatever the amount of alcohol used, it is not possible to convert all the SiW functional groups, with W=H, of the starting polyorganosiloxane. Thus, after a certain degree of conversion limit, which varies according to the reaction conditions, the stoichiometry and the nature of the reactants, the residual SiH groups become inactive with respect to dehydrocondensation. For example, in the presence of ethanol, the degree of conversion of the initial SiH functional groups levels out at 66%.

This novel dehydrocondensation thus results in a polyorganosiloxane containing at least one added functionality and free SiH functional groups and making possible access to the multifunctional polyorganosiloxane, as described subsequently.

The alcohols used are preferably linear or branched monohydroxylated alkanols (primary, secondary or tertiary, preferably primary) preferably chosen from the following list: methanol, ethanol, (iso)propanol or (n)butanol, ethanol being preferred.

As regards the catalyst, it is advantageously chosen from those containing at least one of the following elements: Pt, Rh, Ru, Pd, Ni and their combinations, this catalyst optionally being coupled to an inert or active support.

The catalyst can advantageously be taken from the family of platinum catalysts conventionally used for carrying out hydrosilylation reactions. These platinum catalysts are fully described in the literature. Mention may in particular be made of the complexes of platinum and of an organic product described in United States Patents U.S. Pat. Nos. 3,159,601, 3,159,602 and 3,220,972 and European Patents EP-A-057,459, EP-188,978 and EP-A-190,530 and the complexes of platinum and of vinylated organopolysiloxane described in United States Patents U.S. Pat. Nos. 3,419,593, 3,715,334, 3,377,432 and 3,814,730. The Karstedt catalyst is an example of a platinum catalyst suitable for the process according to the invention (Patent U.S. Pat. No. 3,775,452, Karstedt).

Nickel-based catalysts, such as, for example, Raney nickel, are a possible alternative to platinum catalysts.

As regards the reaction conditions, the dehydrocondensation can be carried out in a wide temperature range, extending, for example, from 0 to 200° C., but it is clear that it is preferable for it to be carried out at a temperature of between 20 and 80° C., preferably between 40 and 70° C.

The second phase of the process comprises an addition reaction of the intermediate hydrogen-containing polyorganosiloxane produced by dehydrocondensation to at least one olefin compound carrying at least one π-bond.

It involves a hydrosilylation mechanism, in the presence of a catalyst and, preferably, at a temperature of between 5 and 100° C. and more preferentially still between 20 and 90° C.

According to a preferred methodology, the hydrosilylation is initiated by adding the olefin compound, from which the W radical as defined above derives, to the intermediate alkoxylated polyorganosiloxane, once the dehydrocondensation is complete. In practice, this addition can be carried out when hydrogen evolution has ceased.

The reactive alkene can be formed by a mixture of products containing a single or a number of precursor species of W radicals which determine the multifunctionality of the final polyorganosiloxane. In the case where provision is made for a number of W species, the alkene corresponding to the second functionality is preferably first allowed to react, then, once this alkene has completely reacted, the alkene corresponding to the third functionality is incorporated, and so on.

Instead of being incorporated in the reaction mixture after the dehydrocondensation, the olefin compound which is the precursor of W can be made use of before beginning this first phase of the process, or alternatively during this phase.

According to a preferred implementation of the process, it is seen to that the hydrosilylation is catalysed by at least a portion of the dehydrocondensation catalyst and preferably exclusively by this catalyst.

The olefin compounds used can easily be deduced from the definition of W given above. The choice with respect to this radical is determined by the targeted applications (one or a number of different functionalities).

The hydrosilylation phase can advantageously take place at ambient temperature and in bulk or in solution, for example in the alcohol which has been used as solvent and as reactant in the dehydrocondensation reaction.

At the end of the reactions, the crude polyorganosiloxanes which are obtained can be purified, in particular by passing through a column filled with an ion-exchange resin and/or by simple evaporation of the reactants introduced in excess and optionally of the solvent used, by heating carried out between 100 and 180° C. under reduced pressure.

The starting polyorganosiloxane is advantageously selected from those corresponding to the following formula (VI):

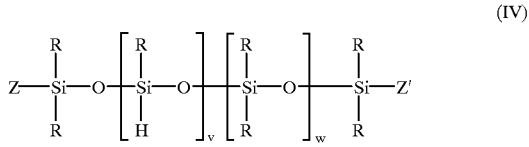

(IV)

in which:
the R symbols are identical or different and are as defined above in the key to the formula of the units (I) and (II),
the Z' symbols are identical or different and correspond to R or to hydrogen,
v is an integer or a decimal $\geq 0$ definable as follows: v=n+m+q; n, m and q corresponding to the definitions given above in the key of the formula (IV), with the condition according to which, if v=0, then $w \geq 1$ and the two Z' radicals correspond to hydrogen,
w corresponds to the same definition as that of p given above in the key of the formula (IV).

The starting polyorganosiloxanes which are used, for example, in the preparation of the functionalized cyclic products are those selected from those corresponding to the following average formula (VII):

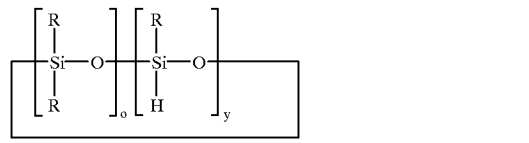

(VII)

in which:
the R symbols are identical or different and are as defined above in the key to the formula of the units (I) and (II),
o corresponds to the same definition as that of u given above in the key of the formula (V),
y is an integer or a decimal $\geq 0$, definable as follows: y=r+s+t and $y+u \geq 3$, r, s, t and u corresponding to the definitions given above in the key of the formula (V).

The functionalized polyorganosiloxanes grafted to the surface of the particles preferably have at least one W functional group which is a group which is compatible with a thermoplastic polymer. Group which is compatible with a thermoplastic polymer is understood to mean a group which enables the particles to be wetted by such a polymer or a group which reacts with the said thermoplastic polymer. The person skilled in the art knows the groups which are compatible with each type of thermoplastic.

Mention may be made, as examples of W groups which are compatible with thermoplastic polymers, of:
$C_7$–$C_{18}$ alkyls which are compatible with polyolefins,
acrylics which are compatible with PVCs (poly(vinyl chloride)s) and PVDFs.

According to the invention, the content by weight of a particle in functionalized polyorganosiloxane, expressed as $SiO_2$, is generally at least 0.1% with respect to the weight of the treated particle, preferably at most 5% and more preferentially still at most 3%. This content is measured by X-ray fluorescence.

As a specific alternative form, the inorganic particles used in the context of the invention are monoparticles of the same chemical nature.

In addition, the inorganic particles according to the invention can be chosen from particles of pigmental nature. As non-limiting examples, the particles of pigmental nature can be rare-earth metal sulphides, including cerium sulphide, titanium dioxide, iron oxide, chromium oxide, zinc sulphide, zinc oxide, ultramarine blue, their mixtures, and the like. The particles are preferably particles of titanium dioxide and particles of rare-earth metal sulphides, in particular alkali metal and alkaline-earth metal sulphides. It can relate, for example, to the particles described in EP-A-0,545,746 and EP-A-0,680,930.

The size of the particles according to the invention can be variable, depending on the application for which they are intended. If it is desired to use the particles as pigments, the size of a particle is a size characteristic of a pigmental application, for example of at most 1 $\mu$m for titanium dioxide. However, it is also possible to treat particles of smaller size, for example nanoparticles exhibiting a size of less than 100 nm and of the same chemical nature as pigmental particles. The particles of nanometric size then themselves also exhibit the advantage of being able to be easily incorporated in a thermoplastic polymer.

It relates in a particularly advantageous way to titanium dioxide. It can be provided in different crystalline forms and in particular in rutile form.

The titanium dioxide particles preferably exhibit a size of between 0.2 and 0.4 $\mu$m.

The particles according to the invention exhibit the advantage of being able to be easily incorporated in mixtures of thermoplastic polymers with a high particle content without very powerful stirring means being necessary.

The invention also relates to processes for the preparation of the particles according to the invention.

A first method of preparation comprises the implementation of the following stages:
inorganic particles are suspended in the functionalized polyorganosiloxane,
the particles are filtered off,
the particles are dried and optionally micronized.

The particle suspension can exhibit a varied concentration which can range up to 900 g/l.

The functionalized polyorganosiloxane can be used pure or in solution. The solvent of the functionalized polyorganosiloxane solution can be chosen from: volatile cyclic organopolysiloxanes (octamethylcyclotetrasiloxane, decamethylcyclopentasiloxane, and the like), short polydimethylsiloxane oils (viscosity of less than 100 mPa·s), hexamethyldisiloxane, ketones (methyl ethyl ketone, and the like), ethers (diethyl ether, and the like), esters (isopropyl myristate, ethyl acetate, and the like), certain chlorinated or chlorofluorinated solvents (methylene chloride, chloroform, and the like), highly branched paraffins (white oils based on isoalkanes and on cycloalkanes, and the like) or alcohols.

After having produced this dispersion, the particles are filtered off and dried at a temperature of the order of 100° C.

Finally, the particles are optionally micronized to the desired final diameter.

According to a second method of preparation of the particles according to the invention, the following stages are carried out:

the functionalized polyorganosiloxane is sprayed over inorganic particles, the particles are dried and optionally micronized.

Here again, the polyorganosiloxane can be used alone or in solution. In the latter case, the polyorganosiloxane solution is of the same nature as that of the first method of preparation. The polyorganosiloxane is sprayed over the particles which are provided in powder form.

The particles are then dried in the same way as in the first method of preparation.

According to a third method of preparation of the particles, inorganic particles are micronized by introducing the functionalized polyorganosiloxane into micronization nozzles.

The polyorganosiloxane can also be used alone or in solution. The polyorganosiloxane solution used is the same as in the preceding methods of preparation.

The particles according to the invention can also be prepared by a fluidized bed process or alternatively using a rotary evaporator.

According to an alternative form of the above processes, the particles to be treated with the functionalized polyorganosiloxane can exhibit hydroxyl groups at their surface. These groups can make possible better grafting of the functionalized polyorganosiloxane to the particles. These groups can be present at the surface of the particles as a result of the nature of the particles. The particles to be treated with the functionalized polyorganosiloxane can also exhibit a surface treatment based on inorganic compounds, such as oxohydroxides of $Al_2O_3$, $TiO_2$, $ZrO_2$, $P_2O_5$, $SiO_2$, $CeO_2$, and the like, which promote the presence of surface hydroxyl groups. This is the case with titanium dioxide, which can be pretreated, for example, with $Al_2O_3$ and/or $SiO_2$.

The invention also relates to a number of compositions comprising particles according to the invention and at least one thermoplastic polymer.

The compositions comprise at least one thermoplastic polymer and particles treated with a polyorganosiloxane, the W functional group being compatible with the polymer of the compositions.

The thermoplastic polymers can be, for example, polyesters, polyamides, polycarbonates, PPS, PEEK, polystyrene, poly(vinyl chloride), poly(vinyl alcohol), styrene-acrylonitrile or acrylonitrile-butadiene-styrene (ABS) copolymers, acrylic polymers, in particular poly (methyl methacrylate), polyolefins, such as polyethylene, polypropylene, polybutene or polymethylpentene, cellulose derivatives, such as, for example, cellulose acetate, cellulose acetobutyrate or ethyl cellulose, polyamides, including polyamide 6-6, and the like, their mixtures or the said polymers which are functionalized (maleic anhydride functional groups, and the like), their isomers, and the like.

It can also relate to fluorinated polymers (PTFE, PVDF), polycarbonates or polyimides.

The invention relates in particular to a composition comprising at least one polyolefin and particles treated with a polyorganosiloxane in which the W organic groups are $C_3$–$C_{18}$, preferably $C_7$–$C_{18}$, alkyl groups.

The invention relates in particular to such a composition, comprising at least one polyolefin and pigment particles treated with a polyorganosiloxane in which the W organic groups are $C_3$–$C_{18}$, preferably $C_7$–$C_{18}$, alkyl groups, comprising at least 70% by weight of particles, preferably 75% and more preferentially still at least 80%. The pigment is preferably titanium dioxide.

Such compositions are masterbatch compositions.

Such compositions can also comprise additives, such as lubricants, light-fast additives, and the like. They are obtained by mixing particles according to the invention in the molten polymer using a twin-screw extruder or an internal mixer, such as, for example, a Brabender plastograph.

The invention relates in addition to the use of the particles in thermoplastic polymers.

The particles according to the invention can be directly incorporated in the thermoplastic polymers or via masterbatches. If it relates to pigment particles, the concentration of the particles according to the invention in the thermoplastic polymers is that of a conventional pigment: it is of the order of 0.1 to 20% by weight with respect to the thermoplastic polymers.

The invention also relates to the items obtained from thermoplastic polymers and comprising particles according to the invention.

The particles according to the invention can also be used in formulations for solvent paints or silicone paints (the silicones being used as binders or additives).

The following examples illustrate the invention without, however, limiting the scope thereof.

EXAMPLES

Example 1

Preparation of a First Polyorganosiloxane Containing Si—OEt and Si-Octyl Functionalities 300 ml of ethanol, dried beforehand over 3 angstrom molecular sieve, and 10 μl of Karstedt catalyst (10% in hexane) are charged, under a nitrogen atmosphere, to a 500 ml three-necked round-bottomed flask equipped with a mechanical stirrer, a thermometer and a drawing funnel. The mixture is stirred at 65° C. and the dropwise addition of the polymethylhydrosiloxane (40 g, $dp_n$=50) is begun. Significant hydrogen evolution is observed. The rate at which the Si—H fluid is run in is adjusted in order to control the hydrogen flow and the exothermicity of the reaction. After having run in the polymethylhydrosiloxane, the mixture is left stirring for one hour. The preparation is thus carried out of the polyorganosiloxane containing Si—OEt and Si—H functionalities (POS SiOEt/SiH) corresponding to the following average formula:

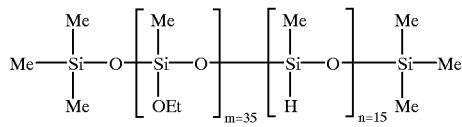

36 g of 1-octene are run dropwise into the reaction mixture obtained. After addition, the reaction mixture is heated at 60° C. until all the Si—H functional groups have been consumed. The excess alcohol and octene are then evaporated. 80 g of clear and slightly coloured oil are obtained. NMR analysis reveals the following structure:

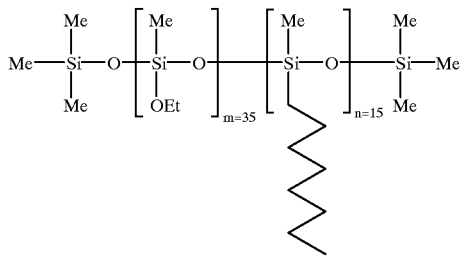
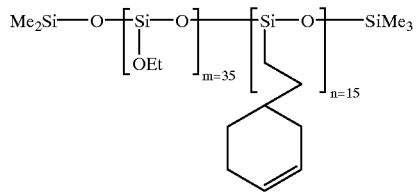

Treatment of titanium dioxide particles

Titanium dioxide particles according to the invention are prepared:

the starting point is rutile titanium dioxide particles with a size of 0.14 μm pretreated by an inorganic treatment based on alumina (1% by weight with respect to $TiO_2$) and on silica (0.6% by weight with respect to $TiO_2$), the polyorganosiloxane obtained above, in solution in ethyl acetate, is sprayed over the titanium dioxide particles, the particles obtained are then dried at 110° C. for 12 h and the particles are then micronized.

Titanium dioxide particles are obtained in which the polyorganosiloxane content by weight is 1%, expressed as $SiO_2$, with respect to the weight of the treated $TiO_2$ particles.

Use of the treated particles in low density polyethylene (LDPE).

The polymer is melted at a temperature of 180° C. in an internal plastograph of Brabender type at a speed of 40 revolutions/min. After 10 min, the treated titanium dioxide particles are introduced so that the content by weight of the particles in the mixture is 85%.

It is then observed that the value of the torque rises and then falls back again to an equilibrium value. The line of the curve of the torque, as a function of time, thus exhibits, at a time of 10 min, a peak known as the incorporation energy peak.

The incorporation energy of the treated titanium dioxide particles corresponds to the integral of this peak, the value of the final torque at equilibrium after incorporation of the titanium being taken as the base line.

This energy is, in the context of this example, 6 J.

Example 2

Preparation of a Polyorganosiloxane Containing Si—OEt and Si-vinylcyclohexenyl Functionalities The preparation is carried out as in Example 1 but 1-octene is replaced by 4-vinyl-1-cyclohexene.

The amounts of reactants used are as follows:

POS SiOEt/SiH=100 g 4-vinyl-1-cyclohexene=39.16 g initial Karstedt catalyst=10 mg.

The temperature of the reaction mixture is maintained at approximately 80–85° C.

130 g of a clear, slightly yellowed oil are recovered, which oil has the formula:

Treatment of titanium dioxide particles

The same titanium dioxide particles as in Example 1 are treated with this functionalized polyorganosiloxane according to the same method as in Example 1, so that titanium dioxide particles are obtained in which the polyorganosiloxane content by weight is 2%, expressed as $SiO_2$, with respect to the treated $TiO_2$ particles.

Use of the treated particles in low density polyethylene (LDPE).

The LDPE is melted at a temperature of 180° C. in an internal plastograph of Brabender type at a speed of 40 revolutions/min. After 10 min, the treated titanium dioxide particles are introduced until their content by weight in the mixture reaches 85%.

An incorporation energy of 3 J is measured according to the method of Example 1.

Comparative Example 3

Treatment of titanium dioxide particles

The same titanium dioxide particles as in Example 1 are treated with polydimethylsiloxane (PDMS) (Rhodorsil 47V50 sold by Rhône-Poulenc) according to the same method as in Example 1, so that titanium dioxide particles are obtained in which the PDMS content by weight is 0.5%, expressed as $SiO_2$, with respect to the treated $TiO_2$ particles.

Use of the treated particles in low density polyethylene (LDPE).

The LDPE is melted at a temperature of 180° C. in an internal plastograph of Brabender type at a speed of 40 revolutions/min. After 10 min, the treated titanium dioxide particles are introduced until their content by weight in the mixture reaches 85%.

An incorporation energy of 45 j is measured according to the method of Example 1.

What is claimed is:

1. Inorganic particles, with the exception of silica, comprising at least one functionalized polyorganosiloxane grafted over all or part of their surface, said polyorganosiloxane comprising, per molecule:

α—on the one hand, at least one functional siloxy unit of formula (I):

$$R_a YSi(O)_{(3-a)/2} \quad (I)$$

in which:

a=0 or 1,

R is a monovalent hydrocarbon radical chosen from linear or branched alkyls having from 1 to 6 atoms, and/or from aryls, the R radicals being identical or different when a=2, Y is a linear or branched alkoxy radical β—and, on the other hand, at least one functional siloxy unit of formula (II):

$$R_b WSi(O)_{(3-b)/2} \quad (II)$$

in which:

b=0, 1 or 2,

R corresponds to the same definition as that given above for the R substituent of the unit (I) and can be identical to or different from the latter, W is a monovalent hydrocarbon radical optionally containing S and/or O atoms and constituting a functional residue connected to the silicon via an Si—C bond, this residue being chosen from the following groups:
  (i) a linear or branched alkyl group comprising at least 7 carbon atoms,
  (2i) a linear or branched $C_2$-$C_{20}$ alkenyl group containing one or a number of double bonds in the chain(s) and/or at the chain end(s), said double bonds optionally being conjugated and/or combined with at least one activating group situated in the α-position and consisting of an ether or a thioether,
  (3i) an unsaturated mono- or bicyclic aliphatic group containing 5 to 20 cyclic carbon atoms and one or two ethylenic double bond(s) in the ring, which double bond(s) is/are optionally substituted by one or two linear or branched $C_1$-$C_3$ alkyl group(s), said cyclic group optionally being connected to the silicon via a linear or branched $C_2$-$C_{10}$ alkylene radical,
  (4i) a mercaptoalkyl group of formula:

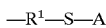 (4i)

in which:
  $R^1$ represents a linear or branched $C_2$-$C_{10}$ alkylene radical optionally comprising at least one oxygen heteroatom or one alkylene-cycloalkylene radical, the alkylene part of which has the same definition as that given immediately above and the cyclic part of which contains 5 to 10 carbon atoms and is optionally substituted by one or two linear or branched $C_1$-$C_3$ alkyl group(s),
  A corresponds:
    either to hydrogen,
    or to a masking group M connected to S by a bond which is labile under given conditions and which makes possible the replacement of M by H or the creation of an active species —$R^1$—S.;
  (5i) a group comprising a polysulphide entity and corresponding to the following formula:

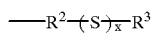 (5i)

with:
  x=1 to 6,
  $R^2$ having the definition as R above,
  $R^3$ is a linear or branched $C_1$-$C_{10}$ alkyl,
  (6i) a group containing at least one ring, at least one of the elements of which is a sulphur atom, and corresponding to the formulae below:

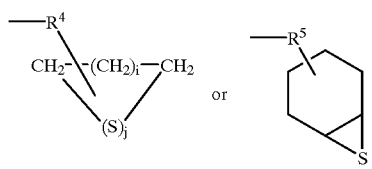

in which
  i=0, 1 or 2 and j=1 to 6
  the $R^4$ and $R^5$ substituents are divalent radicals as defined above for R, (7i) a sulphoxide group of formula:

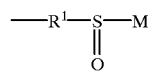 (7i)

in which the $R^1$ and M symbols have the definitions given above for the formula (4i);

γ—and, optionally, at least one residual siloxy unit of formula (III):

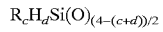 (III)

in which:
  c=0, 1, 2 or 3, d=0 or 1 and c+d ≦3
  the R substituents being as defined above in the units (I) and (II).

2. Particles according to claim 1, the W organic group of the unit (II) of the functionalized polyorganosiloxane is chosen from the following radicals:
  an alkyl radical (i) comprising from 8 to 30 carbon atoms;
  a $C_6$-$C_{10}$ radical (2i) containing a double bond and optionally another conjugated to the first;
  a monocyclic $C_5$-$C_6$ radical (3i), optionally connected to the silicon via a linear or branched $C_2$-$C_6$ alkylene radical.

3. Particles according to claim 1, wherein the functionalized polyorganosiloxane is composed of a statistical, sequential or block linear copolymer of following average formula (IV):

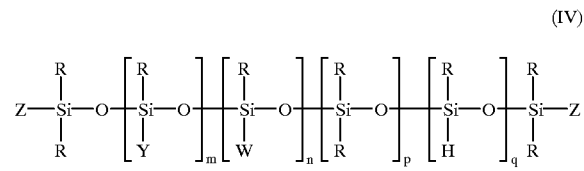 (IV)

in which:
  the Y, W and R symbols are as defined in claim 1,
  the Z symbol is a monovalent radical chosen from the radicals formed by hydrogen and from those corresponding to the definitions R, Y and W,
  the sum m+n+p+q≧3,
  0<m≦100,
  0<n≦100,
  0≦p≦20,
  0≦q≦40.

4. Particles according to claim 1, wherein the functionalized polyorganosiloxane is composed of a cyclic copolymer of following average formula (V):

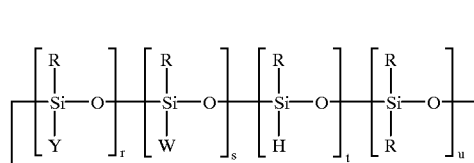 (V)

in which Y, W and R are as defined in claim 1 and with r, s, t and u representing integers or positive decimals:
  the sum r+s+t+u≧3, $1 \leq r \leq 8$,
$1 \leq s \leq 8$,
$0 \leq t \leq 8$,
$0 \leq u \leq 8$.

5. Particles according to claim 1, wherein the content by weight of functionalized polyorganosiloxane, expressed as $SiO_2$, is at least 0.1% with respect to the weight of the treated particles.

6. Particles according to claim 1, wherein the inorganic particles are monoparticles of the same chemical nature.

7. Particles according to claim 1, wherein said particles comprise pigments.

8. Particles according to claim 7, wherein said particles comprise particles of titanium dioxide and/or to particles of rare-earth metal sulphides.

9. Particles according to claim 1, wherein said particles comprise titanium dioxide particles with a size of between 0.2 and 0.4 μm.

10. Process for the preparation of particles according to claim 1, comprising:
    suspending inorganic particles in the functionalized polyorganosiloxane,
    filtering off the particles,
    drying the particles and optionally micronizing said particles.

11. Process for the preparation of particles according to claim 1, comprising:
    spraying the functionalized polyorganosiloxane over inorganic particles,
    drying the particles and optionally micronizing said particles.

12. Process for the preparation of particles according to claim 1, wherein said inorganic particles are micronized by introducing the functionalized polyorganosiloxane into micronization nozzles.

13. Process for the preparation of particles according to claim 11, further comprising pretreating the surface of the inorganic particles with oxyhydroxides of $Al_2O_3$, $TiO_2$, $ZrO_2$, $P_2O_5$, $SiO_2$ or $CeO_2$.

14. Composition, comprising at least one polyolefin and particles according to claim 1, wherein the functional polyorganosiloxane is grafted to the surface of the particles and exhibit at least one $C_7$–$C_{18}$ alkyl W organic group.

15. Composition according to claim 14, comprising at least 70% by weight of titanium dioxide particles.

16. Inorganic particles according to claim 1, wherein
    a is 1,
    R is a linear or branched alkyl comprising methyl, ethyl, propyl or butyl, or a phenyl group,
    Y is a $C_1$–$C_6$ alkoxy, methoxy, ethoxy or (iso)propoxy.

17. Particles according to claim 2, wherein:
    said alkyl radical is octyl, dodecyl, undecyl or tridecyl;
    said $C_5$–$C_{10}$ radical is hexenyl or dodecenyl; and
    said monocyclic $C_5$–$C_6$ radical (3i) is —$CH_2$—$CH_2$—, —$CH_2$—$CH(CH_3)$— or —$(CH_2)_3$—.

18. Particles according to claim 17, wherein t=u=0.

19. Particles according to claim 3, wherein the sum m+n+p+q≥3 is between 3 and 100.

20. Particles according to claim 19, wherein p=q=0, m≥11 and n≤50.

21. Particles according to claim 3, wherein:
    $1 \leq m \leq 50$
    $1 \leq n \leq 50$
    $0 \leq p \leq 10$
    $0 \leq q \leq 20$.

22. Particles according to claim 4, wherein the sum r+s+t+u is between 3 and 8.

23. Particles according to claim 4, wherein the sum r+s+t+u is between 3 and 8.

24. Particles according to claim 4, wherein:
    $1 \leq r \leq 4$
    $1 \leq s \leq 4$
    $0 \leq t \leq 4$
    $0 \leq u \leq 4$.

25. A thermoplastic polymer comprising the particles according to claim 1.

26. A paint formulator comprising the particles according to claim 1.

* * * * *